J. C. COVINGTON.
FERTILIZER DISTRIBUTER.
APPLICATION FILED DEC. 31, 1908.
915,661. Patented Mar. 16, 1909.
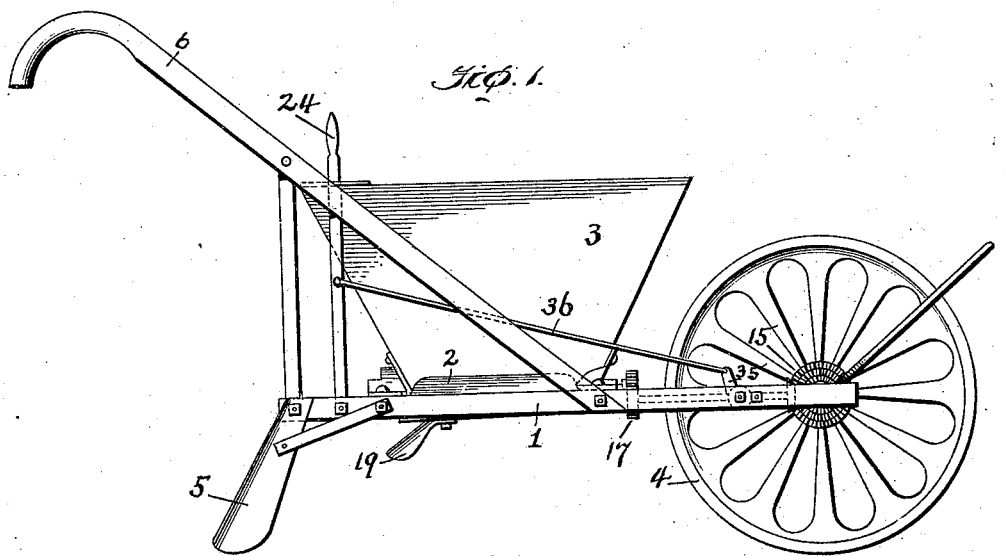
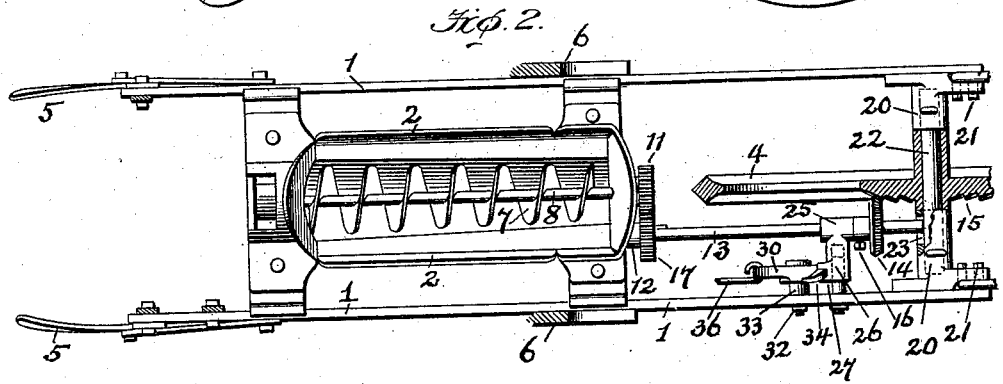
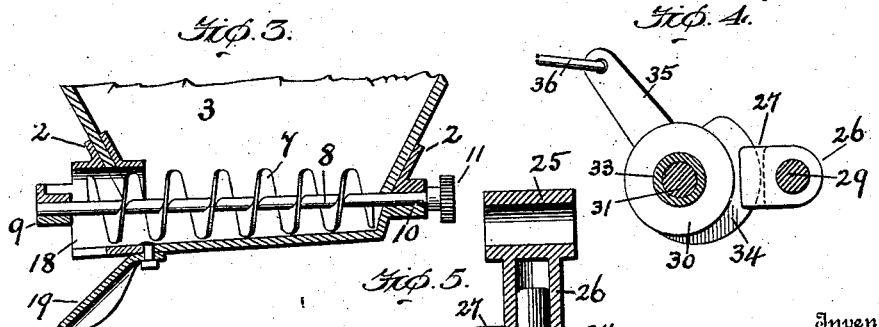
Witnesses
Edwin L. Bradford
G. Ferdinand Vogt
Inventor
John C. Covington,
By Mann & Co.
Attorneys

UNITED STATES PATENT OFFICE.

JOHN C. COVINGTON, OF CLIO, SOUTH CAROLINA, ASSIGNOR OF ONE-HALF TO HENRY J. BENNETT, OF CLIO, SOUTH CAROLINA.

FERTILIZER-DISTRIBUTER.

No. 915,661.      Specification of Letters Patent.      Patented March 16, 1909.

Application filed December 31, 1908. Serial No. 470,217.

*To all whom it may concern:*

Be it known that I, JOHN C. COVINGTON, a citizen of the United States, residing at Clio, in the county of Marlboro and State of South Carolina, have invented certain new and useful Improvements in Fertilizer-Distributers, of which the following is a specification.

This invention relates to a machine to be drawn in the field by animals for the purpose of distributing fertilizer on the ground.

The object of the invention is to provide certain features of improved construction for machines of this character.

The invention is illustrated in the drawing in which,—

Figure 1 is a side elevation of the fertilizer distributer. Fig. 2 shows a horizontal section of the machine. Fig. 3 is a vertical section of the hopper, and shows the feed-screw and the shaft that carries it. Figs. 4 and 5 show detail views, on a larger scale, of the mechanism for stopping or starting the feed-screw while the machine is moving.

In order that the improved features of construction which constitute the present invention may be clearly understood, it has been thought necessary to show the complete mechanism of a fertilizer distributer.

The principal old parts will first be briefly mentioned and then the improved parts will be described more in detail.

Any suitable form of frame may be used; for this purpose two side-bars, 1, are employed and a cast-metal hopper-bottom, 2, is supported on these side-bars; a wood or metal hopper box, 3, is above said bottom. At the front is a traction wheel, 4, and at the rear are two covering shovels, 5,—one at each side. The usual handles, 6, incline from the forward part of the frame upward and back to the rear.

The well-known feed-screw, 7, is used in the bottom of the hopper. At its rear end the hopper has the discharge outlet, 18, and below this is the distributer, 19, whose function is to scatter the fertilizer over a considerable area. This distributer may be easily removed, or adjusted by swinging it around and then the fertilizer will drop directly into the furrow or depression made by the traction wheel. I have made an improvement therein in the mounting of the feed-screw and driving it which consists in mounting said screw, 7, on a shaft, 8, that is in exact alinement with the traction wheel, 4, at the front, whereby both are on a center line through the machine, and thereby a more even distribution of the fertilizer is effected than is obtained when the feed-screw shaft is at one side of the center line, as is sometimes the case.

In this invention the ends of the feed-screw shaft, 8, are supported in bearings, 9, 10, at each end of the hopper-bottom, 2; this shaft projects through the forward bearing, 10, and on the outside far enough to receive a gear-wheel, 11, but does not extend any further. Adjacent the forward bearing, 10, and at the side (see Fig. 2) is another bearing, 12, in the same horizontal plane. This bearing, 12, loosely receives the rear end of a shaft, 13, which extends forward to the traction-wheel and at its forward end carries a pinion, 14, that gears with a central toothed disk on the traction wheel. This central disk, 15, has a plural number of concentric circles of teeth which are familiar in this class of machine, and the pinion, 14, may be shifted along the shaft, 13, by means of a set-screw, 16, so as to cause the pinion to engage the teeth of either circle. The central toothed disk, 15, may be solid with the traction-wheel, 4, or may be otherwise constructed and attached thereto. At its rear end and adjacent the bearing, 12, the shaft, 13, has a gear wheel, 17, that meshes with the gear-wheel, 11, on the feed-screw shaft, 8.

Provision is shown in the drawing for laterally moving the pinion, 14, so the front end of the shaft may be engaged with or entirely disengaged from the central toothed disk, 15. The provision for laterally moving the shaft, 13, will be presently described. At the forward end of the frame are two bearings, 20, one at each side. Each bearing is secured to one of the side-bars, 1, by screws, 21, and an axle, 22, extends across and has its ends fastened in the said bearings, 20. The traction wheel, 4, turns on this axle. One of the bearings, 20, has a horizontal slot, 23, shown in Fig. 2 where the parts are broken away for the purpose of illustration. The forward end of the shaft, 13, is supported in the said slot, 23, and thus the end of the shaft may be moved either toward or away from the traction wheel, 4, for the purpose of causing the pinion, 14, on the shaft to be engaged with or disengaged from the central disk, 15.

I have contrived means whereby the person who is following the machine and guiding it by the handles, 6, as it is drawn forward by animals, may by grasping an upright lever, 24, shift the position of the forward end of the shaft, 13, and stop or start the revolution of the feed-screw, 7. This means will now be described.

A collar, 25, loosely surrounds the shaft, 13, near the pinion, 14, and this collar has a lateral sleeve, 26, which projects toward the side-bar, 1, of the frame, see Figs. 2 and 5. This lateral sleeve has at its end a side boss, 27, which has a vertical groove, 28. A stud, 29, is fixed rigidly to the side-bar, 1, of the frame and projects horizontally into the lateral sleeve, 26. This sleeve may slide back and forth on the stud, 29, and such sliding movement of the sleeve, 26, is necessarily accompanied by a shifting movement of the end of the shaft, 13, in the slot, 23. A cam, 30, is mounted on a stud, 31, which is rigidly secured to the side-bar, 1, by a nut, 32, and a washer, 33, on the stud separates the cam from the side-bar. The cam is free on the stud, 31, to turn or partly turn in a vertical plane and the effective part of the cam comprises a spiral flange, 34, that fits in the vertical groove, 28, on the lateral sleeve, 26. It will be understood that a partial turn of the cam, 30, and its spiral flange, 34, will cause the sleeve, 26, collar, 25, and the forward end of the shaft, 13, to move laterally one way or the other and cause the pinion, 14, to engage or disengage the central disk, 15. The cam-device has an arm, 35; and a rod, 36, connects between this arm and the aforesaid upright lever, 24, which is adjacent the rear part of the hopper and near one end of the handles. It will be seen that by grasping the upright lever, 24, a person may stop or start the feed-screw, 7.

From the foregoing description the operation will be understood.

Having thus described my invention what I claim and desire to secure by Letters Patent is,—

1. In a fertilizer distributer, the combination of a traction-wheel, 4; a hopper; a feed-screw shaft in the bottom of the hopper and in line with the said traction-wheel and having its forward extremity which is outside of the hopper provided with a gear-wheel; a bearing, 12, on the front end of the hopper; a shaft, 13, having its rear end loosely in said bearing and its forward end carrying a pinion to engage the traction wheel and the said end resting in a horizontal slot which permits said end of the shaft to move laterally; a lever, 24, adjacent the rear part of the hopper, and means connecting from said lever to the said forward end of the shaft to cause the shaft to move laterally and the pinion of the shaft to engage or disengage the traction-wheel.

2. In a fertilizer distributer, the combination of a traction-wheel, 4; a hopper; a feed-screw shaft in the bottom of the hopper and in line with the said traction-wheel; a second shaft geared to the feed-screw shaft and out of line therewith and its forward end movable laterally; a collar loose around said second shaft and having a lateral sleeve, 26; a fixed stud over which said sleeve fits movably; a cam mounted to turn or partly turn and shift the said sleeve and the second shaft, and means within convenient reach of the person at the rear who follows the machine to turn said cam.

In testimony whereof I affix my signature in presence of two witnesses.

JOHN C. COVINGTON.

Witnesses:
  F. B. MARKEY,
  R. D. ANDERSON.